United States Patent
Dunlap et al.

(10) Patent No.: US 11,987,524 B2
(45) Date of Patent: *May 21, 2024

(54) BUILDING MATERIALS COMPRISING AGGLOMERATED PARTICLES

(71) Applicant: Specialty Granules Investments LLC, Parsippany, NJ (US)

(72) Inventors: Justin P. Dunlap, Hagerstown, MD (US); John Allen Horton, Frederick, MD (US); Olan Leitch, Bakersfield, CA (US); Daniel E. Rardon, Greencastle, PA (US)

(73) Assignee: Specialty Granules Investments LLC, Parsippany, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/311,918

(22) Filed: May 4, 2023

(65) Prior Publication Data

US 2023/0271883 A1 Aug. 31, 2023

Related U.S. Application Data

(63) Continuation of application No. 17/232,171, filed on Apr. 16, 2021, now Pat. No. 11,680,016, which is a continuation of application No. 16/829,378, filed on Mar. 25, 2020, now Pat. No. 11,008,254.

(60) Provisional application No. 62/884,342, filed on Aug. 8, 2019.

(51) Int. Cl.
| | |
|---|---|
| *C04B 18/02* | (2006.01) |
| *C04B 18/06* | (2006.01) |
| *C04B 111/00* | (2006.01) |
| *E04D 1/00* | (2006.01) |
| *E04D 1/22* | (2006.01) |

(52) U.S. Cl.
CPC .......... *C04B 18/021* (2013.01); *C04B 18/064* (2013.01); *E04D 1/22* (2013.01); *C04B 2111/00586* (2013.01); *E04D 2001/005* (2013.01)

(58) Field of Classification Search
CPC .... C04B 18/021; E04D 1/22; E04D 2001/005
See application file for complete search history.

(56) References Cited

U.S. PATENT DOCUMENTS

| | | | |
|---|---|---|---|
| 3,608,261 A | 9/1971 | French et al. | |
| 4,378,408 A | 3/1983 | Joedicke | |
| 5,488,807 A | 2/1996 | Terrenzio et al. | |
| 6,214,466 B1 | 4/2001 | Joedicke | |
| 6,235,372 B1 | 5/2001 | Joedicke | |
| 6,238,794 B1 | 5/2001 | Beesley et al. | |
| 6,358,305 B1 | 3/2002 | Joedicke | |
| 6,569,520 B1 | 5/2003 | Jacobs | |
| 6,607,781 B2 | 8/2003 | Joedicke | |
| 7,060,658 B2 | 6/2006 | Joedicke | |
| 7,125,601 B1 | 10/2006 | Pinault et al. | |
| 7,595,107 B2 | 9/2009 | Kalkanoglu et al. | |
| 7,651,559 B2 | 1/2010 | Whitaker et al. | |
| 7,833,339 B2 | 11/2010 | Whitaker et al. | |
| 8,039,048 B2 | 10/2011 | Hong et al. | |
| 8,361,597 B2 | 1/2013 | Shiao et al. | |
| 8,394,498 B2 | 3/2013 | Shiao et al. | |
| 8,394,730 B2 | 3/2013 | Grube et al. | |
| 8,491,985 B2 | 7/2013 | Kalkanoglu et al. | |
| 8,668,954 B2 | 3/2014 | Hong et al. | |
| 8,715,540 B2 | 5/2014 | Curzon et al. | |
| 8,771,826 B2 | 7/2014 | Whitaker et al. | |
| 8,793,940 B2 | 8/2014 | Kalkanoglu et al. | |
| 8,920,926 B2 | 12/2014 | Hong et al. | |
| 9,044,921 B2 | 6/2015 | Kalkanoglu et al. | |
| 9,200,451 B2 | 12/2015 | Hong et al. | |
| 9,498,931 B2 | 11/2016 | Jacobs et al. | |
| 9,540,822 B2 | 1/2017 | Shiao et al. | |
| 9,980,480 B2 | 5/2018 | Vanpoulle et al. | |
| 10,392,806 B2 | 8/2019 | Shiao et al. | |
| 11,008,254 B2 * | 5/2021 | Dunlap | .................. C04B 18/021 |
| 11,597,681 B2 | 3/2023 | Skorina et al. | |
| 11,680,016 B2 * | 6/2023 | Dunlap | .................. C04B 18/064 |
| | | | 106/631 |
| 2004/0258435 A1 | 12/2004 | Hays et al. | |
| 2004/0258835 A1 * | 12/2004 | Hong | ..................... E04D 13/002 |
| | | | 427/180 |

(Continued)

FOREIGN PATENT DOCUMENTS

| | | |
|---|---|---|
| CA | 2709653 C | 6/2016 |
| WO | 2018/154427 A1 | 8/2018 |

OTHER PUBLICATIONS

Kiletico et al., "New Approach to Recycle Glass Cullet in Asphalt Shingles to Alleviate Thermal Loads and Reduce Heat Island Effects" J. Mater. Civ. Eng., vol. 27, No. 8, 2015, pp. 04014219-1-04014219-5.

Rex Jameson, "Asphalt Roofing Shingles Into Energy Project Summary Report | Owens Corning |Investigation of Asphalt Shingle Use In Energy Recovery And Other Beneficial Reuse Applications," DOE Contract No. DE-FG36-06GO86009, Apr. 28, 2008, pp. 1-192.

Energy Research and Development Division Final Project Report "Reflectometer Measurement of Roofing Aggregate Albedo," Berkeley Lab, prepared for the California Energy Commission, CEC-500-2014-110, Oct. 2013, pp. 1-37.

(Continued)

*Primary Examiner* — Robert A Vetere
(74) *Attorney, Agent, or Firm* — Venable LLP

(57) ABSTRACT

Roofing granules comprising agglomerated inorganic material, and building materials, such as shingles, that include such roofing granules. By fabricating roofing granules from agglomerating inorganic material it is possible to tailor the particle size distribution so as to provide optimal shingle surface coverage, thus reducing shingle weight and usage of raw materials. Additionally, the use of agglomeration permits the utilization of by-products from conventional granule production processes.

15 Claims, No Drawings

(56) References Cited

U.S. PATENT DOCUMENTS

| | | |
|---|---|---|
| 2007/0231545 A1 | 10/2007 | Ruan |
| 2008/0095984 A1 | 4/2008 | Desouto |
| 2008/0131664 A1 | 6/2008 | Teng et al. |
| 2010/0062153 A1 | 3/2010 | Curzon et al. |
| 2010/0126663 A1 | 5/2010 | Kalkanoglu et al. |
| 2010/0151199 A1 | 6/2010 | Shiao et al. |
| 2010/0203336 A1 | 8/2010 | Shiao et al. |
| 2010/0249353 A1 | 9/2010 | MacIntosh et al. |
| 2011/0027533 A1 | 2/2011 | Kennedy et al. |
| 2011/0189433 A1 | 8/2011 | Kiik et al. |
| 2011/0223385 A1 | 9/2011 | Shiao et al. |
| 2011/0311774 A1 | 12/2011 | Giri et al. |
| 2012/0110932 A1 | 5/2012 | Ehbing et al. |
| 2013/0108873 A1* | 5/2013 | Shiao ............... E04D 7/005 428/404 |
| 2014/0120316 A1* | 5/2014 | Hong ............... E04D 1/26 428/145 |
| 2014/0287166 A1 | 9/2014 | Kalkanoglu et al. |
| 2014/0349072 A1 | 11/2014 | Hong et al. |
| 2015/0192698 A1 | 7/2015 | Joedicke et al. |
| 2015/0218823 A1 | 8/2015 | Shiao et al. |
| 2015/0284544 A1 | 10/2015 | Whitaker et al. |
| 2016/0362339 A1 | 12/2016 | Franzen et al. |
| 2017/0051508 A1 | 2/2017 | Shiao et al. |
| 2017/0107721 A1 | 4/2017 | Zhou |
| 2018/0058071 A1 | 3/2018 | Grube et al. |
| 2018/0145240 A1 | 5/2018 | Shiao et al. |
| 2018/0186694 A1 | 7/2018 | Lante et al. |

OTHER PUBLICATIONS

Levinson et al., "Next-Generation Factory-Produced Cool Asphalt Shingles: Phase 1 Final Report," Lawrence Berkeley National Laboratory, Heat Island Group Energy Technologies Area, LBNL-2001007, Nov. 2016, pp. 1-59.

Sep. 14, 2020 International Search Report and Written Opinion in International Patent Appln. No. PCT/US2020/045522.

May 28, 2021 Canadian Official Action in Canadian Patent Appln. No. 3, 116,636.

Jun. 25, 2021 Canadian Official Action in Canadian Patent Appln. No. 3, 116,636.

\* cited by examiner

BUILDING MATERIALS COMPRISING AGGLOMERATED PARTICLES

CROSS-REFERENCE TO RELATED APPLICATIONS

This application is a continuation of application Ser. No. 17/232,171 filed Apr. 16, 2021, which is a continuation of application Ser. No. 16/829,378 filed Mar. 25, 2020, U.S. Pat. No. 11,008,254 B2, which claims the benefit of U.S. Provisional Patent Appln. No. 62/884,342 filed Aug. 8, 2019.

FIELD OF THE INVENTION

The invention relates to building materials (such as shingles) that include roofing granules comprising agglomerated inorganic material. The invention also relates to roofing granules comprising agglomerated inorganic material. By fabricating roofing granules from agglomerated inorganic material, it is possible to tailor the particle size distribution so as to provide improved surface coverage for roofing products, thus reducing roofing product weight and usage of raw materials. Additionally, the use of agglomeration permits the utilization of by-products from conventional granule production processes.

BACKGROUND OF THE INVENTION

Roofing products are an important category of building material. Roofing products are often divided into three broad groups: shingles, roll roofing, and underlayment. Roofing shingles have been used extensively in residential housing as roof covering due to their aesthetics, ease of installation, water shedding function, and excellent field performance over a long period of time.

Traditional roofing shingles are based upon a fiberglass or felt mat that is coated and impregnated with an asphalt-based composition that is coated with roofing granules. Roofing shingles may be single layer strip shingles, laminated shingles having two or more layers, interlocking shingles and large individual shingles in a variety of weights and colors. Such laminated asphalt shingles are also often referred to as composite shingles, architectural shingles or dimensional shingles.

The shingle fiberglass or felt mat serves as a matrix to support the other components and gives the shingle the required strength to withstand manufacturing, handling, installation and service in the intended environment. An asphalt coating formulated for the particular service application is often applied to the base material to provide the desired long-term ability to resist weathering and to provide stability under temperature extremes.

Typically, the roofing granules applied to roofing shingles or roll roofing are size-graded stone particles. Different sizes of roofing granules may be applied to different areas of the shingle surface (e.g., back surface, headlap, buttlap, etc.) depending on the required properties of a given area. For example, roofing granules may protect the shingle asphalt from UV and impact damage, provide aesthetic effects on exposed surfaces and impart fire resistance.

It is beneficial to minimize the weight of roofing granules applied to the shingle or roll roofing in order to reduce (a) roof loading; (b) shipping costs; (c) raw material utilization; and (d) to facilitate installation. It is also advantageous to reduce raw material costs by making use of by-products of other processes, such as rock fines.

There is thus a need for roofing granules that provide optimal shingle or roll roofing surface covering and that can be made from waste materials, such as rock fines.

SUMMARY OF THE INVENTION

In one aspect, the invention relates to a method comprising: obtaining (a) at least one of a rock, a mineral, or a combination thereof and (b) a binder; mixing (a) the at least one of a rock, a mineral, or a combination thereof and (b) the binder to produce agglomerated particles; and applying the agglomerated particles to a sheet to form a roofing product.

In another aspect, the invention relates to a method comprising: (1) obtaining (a) at least one of a rock, a mineral, or a combination thereof and (b) a binder, wherein the at least one of a rock, a mineral, or a combination thereof have a particle size passing US Mesh 40; (2) mixing (a) the at least one of a rock, a mineral, or a combination thereof and (b) the binder to produce unsintered agglomerated particles; and (3) applying the unsintered agglomerated particles to a sheet to form a roofing product.

In another aspect, the roofing product is a shingle or roll roofing.

In another aspect, the binder is present in in the agglomerated particles in an amount of 1 wt % to 10 wt % with respect to a total weight of the agglomerated particles.

In yet another aspect, the binder is present in in the agglomerated particles in an amount of about 2 wt % to 10 wt %.

In another aspect, the binder is present in in the agglomerated particles in an amount of about 6 wt % to 10 wt %.

In another aspect, the at least one of a rock, a mineral, or a combination thereof comprises one or more of basalt, metabasalt, andesite, and rhyolite.

In another aspect, the binder is at least one of sodium silicate, gypsum, or a combination thereof.

In another aspect, the at least one of a rock, a mineral, or a combination thereof comprises metabasalt.

In another aspect, the binder comprises sodium silicate.

In another aspect, the agglomerated particles have a coating comprising silicate and clay.

In another aspect, the mixing uses a pin mixer.

In another aspect, the method further comprises pelletizing the agglomerated particles.

In another aspect, the method further comprises drying the agglomerated particles.

In another aspect, the invention relates to a method comprising: (1) obtaining (a) at least one of a rock, a mineral, or combination thereof and (b) a binder; (2) mixing the at least one of a rock, a mineral, or a combination thereof and the binder to produce agglomerated particles; and (3) applying the agglomerated particles to a sheet to form a shingle, wherein, when wt % is assessed with respect to a total weight of the agglomerated particles, (A) the agglomerated particles have a particle size distribution comprising (1) at least about 10 wt % retained by US Mesh 50 after passing US Mesh 40, (2) at least about 5 wt % retained by US Mesh 60 after passing US Mesh 50, and (3) at least about 5 wt % retained by US Mesh 100 after passing US Mesh 70; or (B) the agglomerated particles have a particle size distribution comprising (1) at least about 40 wt % retained by US Mesh 16 after passing US Mesh 12, (2) at least about 30 wt % retained by US Mesh 20 after passing US Mesh 16, and (3) at least about 20 wt % retained by US Mesh 30 after passing US Mesh 20; or (C) the agglomerated particles have a particle size distribution comprising (1) at least about 1 wt % retained by US Mesh 20 after passing US Mesh 16, (2) at least about 40 wt % retained by US Mesh 30 after passing US Mesh 20, and (3) at least about 2 wt % retained by US Mesh 40 after passing US Mesh 30.

In another aspect, the agglomerated particles have a particle size distribution comprising (1) at least about 20 wt % retained by US Mesh 50 after passing US Mesh 40, (2) at least about 10 wt % retained by US Mesh 60 after passing US Mesh 50, and (3) at least about 10 wt % retained by US Mesh 100 after passing US Mesh 70.

In another aspect, the agglomerated particles have a particle size distribution comprising (1) at least about 30 wt % retained by US Mesh 50 after passing US Mesh 40, (2) at least about 20 wt % retained by US Mesh 60 after passing US Mesh 50, and (3) at least about 20 wt % retained by US Mesh 100 after passing US Mesh 70.

In another aspect, the agglomerated particles have a particle size distribution comprising (1) at least about 40 wt % retained by US Mesh 16 after passing US Mesh 12, (2) at least about 30 wt % retained by US Mesh 20 after passing US Mesh 16, and (3) at least about 20 wt % retained by US Mesh 30 after passing US Mesh 20.

In another aspect, the agglomerated particles have a particle size distribution comprising (1) at least about 2 wt % retained by US Mesh 20 after passing US Mesh 16, (2) at least about 50 wt % retained by US Mesh 30 after passing US Mesh 20, and (3) at least about 10 wt % retained by US Mesh 40 after passing US Mesh 30.

In another aspect, the agglomerated particles have a particle size distribution comprising (1) at least about 5 wt % retained by US Mesh 20 after passing US Mesh 16, (2) at least about 60 wt % retained by US Mesh 30 after passing US Mesh 20, and (3) at least about 20 wt % retained by US Mesh 40 after passing US Mesh 30.

In another aspect, the binder is present in in the agglomerated particles in an amount of 1 wt % to 10 wt % with respect to a total weight of the agglomerated particles.

In another aspect, the binder is present in in the agglomerated particles in an amount of about 6 wt % to 10 wt %.

In a still further aspect, the binder is at least one of sodium silicate, gypsum, or a combination thereof.

In another aspect, the agglomerated particles have a coating comprising silicate and clay.

In another aspect, the mixing uses a pin mixer.

In another aspect, the method further comprises pelletizing the agglomerated particles.

In another aspect, the method further comprises drying the agglomerated particles.

In another aspect, the invention relates to a shingle or roll roofing comprising agglomerated particles comprising (a) at least one of a rock, a mineral, or a combination thereof and (b) a binder, wherein, when wt % is assessed with respect to a total weight of the agglomerated particles, (A) the agglomerated particles have a particle size distribution comprising (1) at least about 10 wt % retained by US Mesh 50 after passing US Mesh 40, (2) at least about 5 wt % retained by US Mesh 60 after passing US Mesh 50, and (3) at least about 5 wt % retained by US Mesh 100 after passing US Mesh 70; or (B) the agglomerated particles have a particle size distribution comprising (1) at least about 40 wt % retained by US Mesh 16 after passing US Mesh 12, (2) at least about 30 wt % retained by US Mesh 20 after passing US Mesh 16, and (3) at least about 20 wt % retained by US Mesh 30 after passing US Mesh 20; or (C) the agglomerated particles have a particle size distribution comprising (1) at least about 1 wt % retained by US Mesh 20 after passing US Mesh 16, (2) at least about 40 wt % retained by US Mesh 30 after passing US Mesh 20, and (3) at least about 2 wt % retained by US Mesh 40 after passing US Mesh 30.

Among those benefits and improvements that have been disclosed, other objects and advantages of this invention will become apparent from the following description. Detailed embodiments of the invention are disclosed herein; however, it is to be understood that the disclosed embodiments are merely illustrative of the invention that may be embodied in various forms. In addition, each of the examples given in connection with the various embodiments of the invention which are intended to be illustrative, and not restrictive.

Throughout the specification and claims, the following terms take the meanings explicitly associated herein, unless the context clearly dictates otherwise. The phrases "in one embodiment" and "in some embodiments" as used herein do not necessarily refer to the same embodiment(s), though they may. Furthermore, the phrases "in another embodiment" and "in some other embodiments" as used herein do not necessarily refer to a different embodiment, although they may. Thus, as described below, various embodiments of the invention may be readily combined, without departing from the scope or spirit of the invention.

DETAILED DESCRIPTION

One embodiment pertains to a roofing shingle that includes roofing granules comprised of agglomerated particles. Agglomerated particles may be applied to the back surface, buttlap and/or headlap of the shingle. In an embodiment, the agglomerated particles applied to the back surface, buttlap and/or headlap of the shingle have different particle size distributions. The choice of particle size distribution selected for a shingle surface may be influenced by the balance of surface coverage, shingle weight, degree of flatness and impact resistance required. The shingle may be a single-layer shingle or a laminated shingle.

Examples of a sheet that may be used to make the shingle are as follows. In particular, in an embodiment, the shingle may be formed from a fiberglass mat with an asphalt coating on both sides of the mat. In an embodiment, the shingle may be formed from organic felt or other types of base material, including synthetic mats or synthetic glass/hybrid mats having an appropriate coating. Non-limiting examples of coatings include asphalt and modified bituminous coatings based on atactic polypropylene (APP), styrene-butadiane-styrene (SBS), styrene-ethylene-butadiene-styrene (SEBS), amorphous polyalpha olefin (APAO), thermoplastic polyolefin (TPO), synthetic rubber or other asphaltic modifiers.

In an embodiment, two or more shingles are installed on a roof deck in a roofing system such that the shingles are in a row from left to right and the lateral edges of the shingles in the row are contiguous with each other so as to abut each other, i.e., their lateral edges are adjacent to one another. Each row represents a course and the shingles are applied in overlapping courses on the roof deck, wherein the buttlap portion of a subsequent course is placed on the headlap portion of a previous course. In an embodiment, the headlap portion of the shingle is at least as wide as the buttlap portion of the shingle so that when the shingles are installed on a roof deck in overlapping courses, the entire buttlap portion of a subsequent course has headlap beneath it. In an embodiment, an edge of the shingle has a plurality of dragon teeth with openings therebetween. In an embodiment of the laminated shingle, a backer strip is provided under the dragon teeth, with portions of the backer strip exposed through the openings between the dragon teeth. In an embodiment of the single layer shingle, when the shingle is installed on a roof deck, the dragon teeth of a second layer of shingles is placed on the headlap of a previously installed layer of shingles, such that portions of the headlap region are exposed through the openings between the dragon teeth.

One embodiment pertains to a roofing system comprising one or more shingles that comprise the agglomerated particles.

A. AGGLOMERATED PARTICLES—COMPOSITION

In an embodiment, the agglomerated particles comprise binder and inorganic material. In an embodiment the inorganic material comprises rock and/or mineral fragments (i.e., fragments of (a) rock and/or (b) mineral). In an embodiment, the rock and/or mineral fragments comprise fines and/or larger particle sizes.

In one embodiment, the rock and/or mineral fragments are of such a particle size as to pass US Mesh 40. In other embodiments, the rock and/or mineral fragments are of such a particle size as to pass US Mesh 50, or US Mesh 60, or US Mesh 70, or US Mesh 100, or US Mesh 120, or US Mesh 140, or US Mesh 200, or US Mesh 230, or US Mesh 270, or US Mesh 325. Ranges based on any of the foregoing are also contemplated, e.g., the rock and/or mineral fragments may have particle sizes passing US Mesh 40 but retained by US Mesh 270.

Non-limiting examples of binders include sodium silicate, gypsum or other cementitious binders. Non-limiting examples of rock and/or mineral materials include igneous rocks such as basalt, andesite, and rhyolite, amphibolite produced from the metamorphism of the basalt parent such as metabasalt, or combinations thereof—e.g., basalt and metabasalt; basalt and andesite.

In an embodiment, the binder content of the agglomerated particles is at least about 1 wt %, at least about 2 wt %, at least about 3 wt %, at least about 5 wt %, or at least about 10 wt %.

In an embodiment, the binder content of the agglomerated particles is from about 1 wt % to about 10 wt %. In an embodiment, the binder content of the agglomerated particles is from about 1 wt % to about 8 wt %. In an embodiment, the binder content of the agglomerated particles is from about 1 wt % to about 6 wt %. In an embodiment, the binder content of the agglomerated particles is from about 1 wt % to about 3 wt %. In an embodiment, the binder content of the agglomerated particles is from about 1 wt % to about 2 wt %.

In an embodiment, the binder content of the agglomerated particles is from about 2 wt % to about 10 wt %. In an embodiment, the binder content of the agglomerated particles is from about 4 wt % to about 10 wt %. In an embodiment, the binder content of the agglomerated particles is from about 6 wt % to about 10 wt %. In an embodiment, the binder content of the agglomerated particles is from about 8 wt % to about 10 wt %.

In an embodiment, the binder content of the agglomerated particles is from about 2 wt % to about 8 wt %. In an embodiment, the binder content of the agglomerated particles is from about 3 wt % to about 6 wt %. In an embodiment, the binder content of the agglomerated particles is from about 2 wt % to about 3 wt %.

In an embodiment, the binder content of the agglomerated particles is about 3.5 wt %. In an embodiment, the binder content of the agglomerated particles is about 3 wt %. In an embodiment, the binder content of the agglomerated particles is about 2.5 wt %. In an embodiment, the binder content of the agglomerated particles is about 1 wt %.

In embodiments, the agglomerated particles comprise the binder content of any of the embodiments detailed herein with the rock and/or mineral fragments forming the remainder.

In an embodiment the agglomerated particles are coated. In an embodiment, the coating is semi-ceramic. In an embodiment, the semi-ceramic coating comprises silicate and clay. In an embodiment, the coating provides color to the agglomerated particles. In an embodiment, coated agglomerated particles are applied to the buttlap of the shingle.

In one embodiment, the agglomerated particles consist essentially of, or consist of, (a) the rock and/or mineral fragments and (b) the binder, or (a) the rock and/or mineral fragments, (b) the binder, and (c) the coating.

B. AGGLOMERATED PARTICLES—PARTICLE SIZE DISTRIBUTION

In an embodiment, the agglomerated particles have a particle size distribution. In an embodiment, the particle size distribution is monomodal, bimodal or multimodal. That is, the agglomerated particles may have one, two or multiple modal sizes.

In an embodiment, the particle size distribution of the agglomerated particles applied to the back surface of the shingle comprises at least about 10 wt % particles of US Mesh 50, at least about 20 wt % particles of US Mesh 50, at least about 30 wt % particles of US Mesh 50, or at least about 40 wt % particles of US Mesh 50. In an embodiment, the particle size distribution of the agglomerated particles applied to the back surface of the shingle comprises at least about 5 wt % particles of US Mesh 60, at least about 10 wt % particles of US Mesh 60, at least about 20 wt % particles of US Mesh 60, or at least about 30 wt % particles of US Mesh 60. In an embodiment, the particle size distribution of the agglomerated particles applied to the back surface of the shingle comprises at least about 5 wt % particles of US Mesh 100, at least about 10 wt % particles of US Mesh 100, at least about 20 wt % particles of US Mesh 100, or at least about 30 wt % particles of US Mesh 100.

In an embodiment, the particle size distribution of the agglomerated particles applied to the headlap of the shingle comprises at least about 20 wt % particles of US Mesh 16, at least about 30 wt % particles of US Mesh 16, at least about 40 wt % particles of US Mesh 16, or at least about 50 wt % particles of US Mesh 16. In an embodiment, the particle size distribution of the agglomerated particles applied to the headlap of the shingle comprises at least about 10 wt % particles of US Mesh 20, at least about 20 wt % particles of US Mesh 20, at least about 30 wt % particles of US Mesh 20, or at least about 40 wt % particles of US Mesh 20. In an embodiment, the particle size distribution of the agglomerated particles applied to the headlap of the shingle comprises at least about 5 wt % particles of US Mesh 30, at least about 10 wt % particles of US Mesh 30, at least about 20 wt % particles of US Mesh 30, or at least about 30 wt % particles of US Mesh 30.

In another embodiment, the particle size distribution of the agglomerated particles applied to the headlap of the shingle comprises at least about 1 wt % particles of US Mesh 20, at least about 2 wt % particles of US Mesh 20, at least about 5 wt % particles of US Mesh 20, at least about 10 wt % particles of US Mesh 20, at least about 20 wt % particles of US Mesh 20, or at least at least about 30 wt % particles of US Mesh 20. In an embodiment, the particle size distribution of the agglomerated particles applied to the headlap of the shingle comprises at least about 40 wt % particles of US Mesh 30, at least about 50 wt % particles of US Mesh 30, at least about 60 wt % particles of US Mesh 30, at least about 70 wt % particles of US Mesh 30, or at least about 80 wt % particles of US Mesh 30. In an embodiment, the particle size distribution of the agglomerated particles applied to the headlap of the shingle comprises at least about 2 wt % particles of US Mesh 40, at least about 4 wt % particles of US Mesh 40, at least about 10 wt % particles of US Mesh 40, at least about 20 wt % particles of US Mesh 40, at least about 30 wt % particles of US Mesh 40, or at least about 40 wt % particles of US Mesh 40.

C. METHOD OF MAKING THE AGGLOMERATED PARTICLES

One embodiment of this invention pertains to a method of making agglomerated particles that are applied to the shingles. In an embodiment, rock and/or mineral fragments are combined with a liquid or dry binder in a pin mixer. In the pin mixer, pins or rods attached to a horizontal spinning shaft mix the components and produce agglomerated particles by the action of centrifugal force. In an embodiment, the agglomerated particles produced by the pin mixer are substantially spherical. In an embodiment, the agglomerated particles produced by the pin mixer may be dried and used directly. Agglomerated particles made by the pin mixer may be applied to the back surface or headlap of a shingle.

In another embodiment, the agglomerated particles produced by the pin mixer are combined with further liquid binder in a disc or pan pelletizer. The agglomerated particle size is increased by the actions of tumble growth and centrifugal force. The agglomerated particle size may be controlled by varying the disc angle and speed of rotation, and by modulating the properties of the input particles and liquid binder. Once the desired agglomerated particle size is achieved the agglomerated particles may be dried. The disc or pan pelletizer increases the agglomerated particle size and produces agglomerated particles that may be applied to the buttlap of a shingle. In an embodiment, the agglomerated particles are dried after leaving the pin mixer, or disc or pan pelletizer. In an embodiment, the agglomerated particles are dried in a fluid bed drying system. In the fluid bed drying system hot air flows through a perforated plate that both dries the agglomerated particles and moves the agglomerated particles through the apparatus. In an embodiment, the fluid bed drying system comprises multiple heating zones and a final cooling zone.

D. METHOD OF APPLYING THE AGGLOMERATED PARTICLES TO A ROOFING SHINGLE

In some embodiments, the invention relates to the method of applying the agglomerated particles to a shingle. In some embodiments, the method includes application of the agglomerated particles to at least one of the back surface, the buttlap or the headlap of the shingle. Manufacturing the shingle includes applying agglomerated particles to asphalt coated sheeting. The asphalt sheet is then pressed in a press roll unit, such that the agglomerated particles embed in the asphalt coating. The asphalt sheet is then cut to the desired shape on a machine line. In embodiments, the invention includes the method of making the agglomerated particles and applying the agglomerated particles to a shingle as detailed herein.

In one embodiment, the agglomerated particles are not sintered before being used. In other words, the agglomerated particles are, without being sintered, used to make a roofing material such as a shingle or roll roofing. As used herein "sintering" is the process of compacting and forming a solid mass of material by heat or pressure without melting it to the point of liquefaction.

E. EXAMPLES

Specific embodiments of the invention will now be demonstrated by reference to the following examples. It should be understood that these examples are disclosed by way of illustrating the invention and should not be taken in any way to limit the scope of the invention.

EXAMPLES

Example 1

An exemplary particle size distribution of the agglomerated particles applied to the back surface of a shingle is given in Table 1.

TABLE 1

| US Mesh | Tyler Mesh | Wt % Retained |
|---|---|---|
| 30 | 28 | 0-0 |
| 40 | 35 | 0-5 |
| 50 | 48 | 20-32 |
| 60 | 60 | 10-20 |
| 70 | 65 | 6-15 |
| 100 | 100 | 15-25 |
| 140 | 150 | 7-17 |
| 200 | 200 | 4-10 |
| Pan | Pan | 2-11 |

Further exemplary particle size distributions of the agglomerated particles applied to the back surface of a shingle are given in Table 2.

TABLE 2

| US Mesh | Tyler Mesh | Wt % Retained Range |
|---|---|---|
| 30 | 28 | 0.0-0.0 |
| 40 | 35 | 3.1-4.8 |
| 50 | 48 | 19.9-21.6 |
| 60 | 60 | 13.3-13.8 |
| 70 | 65 | 9.5-10.8 |
| 100 | 100 | 19.5-21.6 |
| 140 | 150 | 13.2-14.4 |
| 200 | 200 | 8.8-9.0 |
| Pan | Pan | 7.3-9.3 |

An exemplary particle size distribution of the agglomerated particles applied to the headlap of a shingle is given in Table 3.

TABLE 3

| US Mesh | Tyler Mesh | Wt % Retained |
|---|---|---|
| 8 | 8 | 0-0 |
| 12 | 10 | 4-10 |
| 16 | 14 | 30-45 |
| 20 | 20 | 25-35 |
| 30 | 28 | 14-24 |
| 40 | 35 | 2-9 |
| Pan | Pan | 0-2 |

A further exemplary particle size distribution of the agglomerated particles applied to the headlap of a shingle is given in Table 4.

TABLE 4

| US Mesh | Tyler Mesh | Wt % Retained |
|---|---|---|
| 12 | 10 | 0-0 |
| 16 | 14 | 0-6 |
| 20 | 20 | 2-26 |
| 30 | 28 | 48-76 |
| 40 | 35 | 4-32 |
| Pan | Pan | 0-6 |

The choice of particle size distribution selected for a shingle may be influenced by the balance of surface coverage, shingle weight, degree of flatness and impact resistance required.

By way of reference, below is a table, Table 5, showing the correspondence between US Mesh, Tyler Mesh, and the sieve opening size in inches and micrometers:

TABLE 5

| ISO Standard Sieve Size | Opening | | Standard Mesh | |
|---|---|---|---|---|
| mm or μm as indicated | inches (in) approximate equivalents | mm | US Mesh | Tyler Mesh |
| 5.60 mm | 0.2230 | 5.600 | 3.5 | 3.5 |
| 4.75 mm | 0.1870 | 4.750 | 4 | 4 |
| 4.00 mm | 0.1570 | 4.000 | 5 | 5 |
| 3.35 mm | 0.1320 | 3.350 | 6 | 6 |
| 2.80 mm | 0.1100 | 2.800 | 7 | 7 |
| 2.36 mm | 0.0937 | 2.360 | 8 | 8 |
| 2.00 mm | 0.0787 | 2.000 | 10 | 9 |
| 1.70 mm | 0.0661 | 1.700 | 12 | 10 |
| 1.40 mm | 0.0555 | 1.400 | 14 | 12 |
| 1.18 mm | 0.0469 | 1.180 | 16 | 14 |
| 1.00 mm | 0.0394 | 1.000 | 18 | 16 |
| 850 μm | 0.0331 | 0.850 | 20 | 20 |
| 710 μm | 0.0278 | 0.710 | 25 | 24 |
| 600 μm | 0.0234 | 0.600 | 30 | 28 |
| 500 μm | 0.0197 | 0.500 | 35 | 32 |
| 425 μm | 0.0165 | 0.425 | 40 | 35 |
| 355 μm | 0.0139 | 0.355 | 45 | 42 |
| 300 μm | 0.0117 | 0.300 | 50 | 48 |
| 250 μm | 0.0098 | 0.250 | 60 | 60 |
| 212 μm | 0.0083 | 0.212 | 70 | 65 |
| 180 μm | 0.0070 | 0.180 | 80 | 80 |
| 150 μm | 0.0059 | 0.150 | 100 | 100 |
| 125 μm | 0.0049 | 0.125 | 120 | 115 |
| 106 μm | 0.0041 | 0.106 | 140 | 150 |
| 90 μm | 0.0035 | 0.090 | 170 | 170 |
| 75 μm | 0.0029 | 0.075 | 200 | 200 |
| 63 μm | 0.0025 | 0.063 | 230 | 250 |
| 53 μm | 0.0021 | 0.053 | 270 | 270 |
| 45 μm | 0.0017 | 0.045 | 325 | 325 |
| 38 μm | 0.0015 | 0.038 | 400 | 400 |
| 32 μm | 0.0012 | 0.032 | 450 | |
| 25 μm | 0.0010 | 0.025 | 500 | |
| 20 μm | 0.0008 | 0.020 | 635 | |

As discussed above, one example of rock and/or mineral is basalt; however, metabasalt (which is an amphibolite produced from the metamorphism of the basalt parent) may be used in addition to or instead of basalt. In other words, where the embodiments use the term basalt, they should be read as describing the use of basalt, metabasalt, or a combination of basalt and metabasalt.

CONCLUSION

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art.

While various embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one." Put another way, throughout the specification, the meaning of "a," "an," and "the" include plural references. Any ranges cited herein are inclusive.

The meaning of in includes in and on.

The terms "substantially", "approximately," and "about" used throughout this Specification and the claims generally mean plus or minus 10% of the value stated, e.g., about 100 would include 90 to 110. Thus, as used herein, the term "about X" means X plus or minus 10%. For example, "about 10 wt %" means 9 wt % to 11 wt %.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" may refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. Put another way as used herein, the term "or" is an inclusive "or" operator, and is equivalent to the term "and/or," unless the context clearly dictates otherwise. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The term "based on" is not exclusive and allows for being based on additional factors not described, unless the context clearly dictates otherwise.

As used herein, "wt %" refers to weight percent.

The terms "roofing shingle" and "shingle" are used interchangeably.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

What is claimed is:

1. A method comprising:
    obtaining an agglomerated particle, the agglomerated particle comprising (a) a plurality of fragments of at least one of a rock, a mineral, or a combination thereof and (b) a binder, agglomerated together to form the agglomerated particle, wherein the plurality of fragments of the at least one of a rock, a mineral, or a combination thereof comprises fragments having a particle size passing US Mesh 100 but retained by US Mesh 270, wherein the agglomerated particle is an unsintered agglomerated particle, wherein the at least one of a rock, a mineral, or a combination thereof comprises at least one of basalt, metabasalt, andesite, rhyolite, or a combination thereof, and wherein the binder is present in the agglomerated particle in an amount of not more than 8 wt %; and
    applying the agglomerated particle to a sheet to form a roofing product.

2. The method of claim 1, wherein the roofing product is a shingle or roll roofing.

3. The method of claim 1, wherein the binder is at least one of sodium silicate, gypsum, or a combination thereof.

4. The method of claim 1, wherein the binder comprises sodium silicate.

5. The method of claim 1, wherein the binder comprises gypsum.

6. The method of claim 1, wherein the agglomerated particle is coated by a coating comprising silicate and clay.

7. The method of claim 1, wherein the at least one of a rock, a mineral, or a combination thereof comprises metabasalt.

8. The method of claim 1, wherein the at least one of a rock, a mineral, or a combination thereof comprises andesite.

9. The method of claim 1, wherein the at least one of a rock, a mineral, or a combination thereof comprises rhyolite.

10. The method of claim 1, wherein the agglomerated particle is coated by a coating comprising silicate and clay, and
    wherein the at least one of a rock, a mineral, or a combination thereof is basalt.

11. The method of claim 1, wherein the binder is present in the agglomerated particle in an amount of 2 wt % to 6 wt %.

12. The method of claim 1, wherein the roofing product is an asphalt shingle.

13. The method of claim 1, wherein the sheet comprises a fiberglass mat, and
    wherein the applying the agglomerated particle to a sheet to form a roofing product comprises applying the agglomerated particle to the fiberglass mat which was coated with asphalt.

14. The method of claim 1, wherein the agglomerated particle is substantially spherical.

15. The method of claim 1, wherein the binder is present in the agglomerated particle in an amount of 1 wt % to 8 wt %.

* * * * *